(12) United States Patent
Todderud et al.

(10) Patent No.: US 11,343,962 B2
(45) Date of Patent: May 31, 2022

(54) MECHANICAL KNIFE DRIVE FOR A HEADER OF AN AGRICULTURAL HARVESTER

(71) Applicant: CNH Industrial America LLC, New Holland, PA (US)

(72) Inventors: Stephen Todderud, Lancaster, PA (US); Kevin Ward, Lititz, PA (US); Joel T. Cook, Akron, PA (US)

(73) Assignee: CNH Industrial America LLC, New Holland, PA (US)

( * ) Notice: Subject to any disclaimer, the term of this patent is extended or adjusted under 35 U.S.C. 154(b) by 58 days.

(21) Appl. No.: 16/822,841

(22) Filed: Mar. 18, 2020

(65) Prior Publication Data

US 2021/0289696 A1    Sep. 23, 2021

(51) Int. Cl.
*A01D 34/30* (2006.01)
*A01D 34/04* (2006.01)
*A01D 34/14* (2006.01)

(52) U.S. Cl.
CPC .......... *A01D 34/30* (2013.01); *A01D 34/046* (2013.01); *A01D 34/14* (2013.01)

(58) Field of Classification Search
CPC ........ A01D 34/14; A01D 34/30; A01D 34/38; A01D 34/046
See application file for complete search history.

(56) References Cited

U.S. PATENT DOCUMENTS

| | | | |
|---|---|---|---|
| 3,523,411 A * | 8/1970 | Eberly | A01D 19/08 56/344 |
| 3,651,624 A | 3/1972 | Bandemer | |
| 7,730,709 B2 | 6/2010 | Priepke | |
| 7,937,920 B2 | 5/2011 | Schmidt et al. | |
| 7,950,210 B2 | 5/2011 | Tippery et al. | |
| 8,151,547 B2 | 4/2012 | Bich et al. | |
| 9,402,343 B1 | 8/2016 | Allochis | |
| 9,439,355 B2 | 9/2016 | Surmann et al. | |
| 10,212,884 B2 | 2/2019 | Webermann et al. | |
| 10,721,862 B2 * | 7/2020 | Bich | A01D 34/145 |
| 2009/0145096 A1 * | 6/2009 | Priepke | A01D 41/142 56/257 |

(Continued)

FOREIGN PATENT DOCUMENTS

| | | |
|---|---|---|
| EP | 2179638 A1 | 4/2010 |
| EP | 3616493 A1 | 3/2020 |

OTHER PUBLICATIONS

Extended European Search Report for EP Application No. 21163503.2 dated Sep. 7, 2021 (nine pages).

*Primary Examiner* — Abigail A Risic
(74) *Attorney, Agent, or Firm* — Peter Zacharias; Patrick Sheldrake

(57) ABSTRACT

A header for an agricultural harvester including a knife drive disposed at a forward end of a feeder conveyor. An infeed drive is disposed adjacent the feeder conveyor, the infeed drive having an input and an output. An input shaft is drivingly connected to the infeed drive input, and an output shaft has a first end connected to the infeed drive output and a second end drivingly connected to the knife drive. The knife drive can be a center knife drive and the infeed drive, the input shaft and the output shaft operate as a fully mechanical drive power supply for the center knife drive which overcomes the deficiencies of hydraulically-driven knife drives.

18 Claims, 6 Drawing Sheets

(56) References Cited

U.S. PATENT DOCUMENTS

| | | | |
|---|---|---|---|
| 2014/0215991 A1* | 8/2014 | Brimeyer | A01D 34/02 |
| | | | 56/14.7 |
| 2014/0237970 A1* | 8/2014 | Ritter | A01D 41/142 |
| | | | 56/14.7 |
| 2014/0325951 A1 | 11/2014 | Sethi | |
| 2016/0174460 A1* | 6/2016 | Honey | A01D 34/32 |
| | | | 56/181 |
| 2017/0094898 A1* | 4/2017 | Schumacher | F16H 37/12 |
| 2017/0127611 A1* | 5/2017 | Dunn | A01D 34/38 |
| 2019/0090422 A1* | 3/2019 | Deevy | A01D 34/14 |
| 2019/0208702 A1 | 7/2019 | Cook et al. | |
| 2019/0364726 A1* | 12/2019 | Schuler | A01D 34/14 |
| 2019/0387672 A1 | 12/2019 | Honey et al. | |
| 2021/0068340 A1* | 3/2021 | Herter | A01D 34/13 |
| 2021/0137002 A1* | 5/2021 | Dunn | A01D 34/30 |
| 2021/0144917 A1* | 5/2021 | Gurke | A01D 34/40 |

* cited by examiner

MECHANICAL KNIFE DRIVE FOR A HEADER OF AN AGRICULTURAL HARVESTER

The exemplary embodiments of present invention relate generally to a header of a plant cutting machine (e.g., a combine harvester) and, more specifically, to a header having a knife drive driven by a mechanical power supply.

BACKGROUND OF THE INVENTION

An agricultural harvester e.g., a plant cutting machine, such as, but not limited to, a combine or a windrower, generally includes a header operable for severing and collecting plant or crop material as the harvester is driven over a crop field. The header has a plant cutting mechanism, e.g., a cutter bar, for severing plants or crops via, for example, an elongate sickle mechanism that reciprocates sidewardly relative to a non-reciprocating guard structure. After crops are cut, they are collected inside the header and transported via a conveyor such as a draper belt towards a feederhouse located centrally of the header.

Existing systems for supplying power to knife drives typically use high pressure hydraulic circuits. Such circuits typically include, inter alia, a hydraulic motor and several hoses, including a supply line, a return line and a bleed line. High pressure hydraulic circuits are prone to leakage which detrimentally affects knife drive performance. In addition, hydraulic circuits are temperature sensitive and experience performance loss in extreme conditions, e.g., either very high or very low temperatures. Furthermore, hydraulic circuits are prone to stall when the knife drive is driven at low speeds or in reverse.

SUMMARY OF THE INVENTION

In accordance with an exemplary embodiment there is provided a header for an agricultural harvester comprising a knife drive disposed at a forward end of a feeder conveyor. An infeed drive is disposed adjacent the feeder conveyor, the infeed drive having an input and an output. An input shaft is drivingly connected to the infeed drive input, and an output shaft has a first end connected to the infeed drive output and a second end drivingly connected to the knife drive.

According to an aspect of the exemplary embodiment, the infeed drive input comprises an input pulley, the infeed drive output comprises an output pulley, and the infeed drive further comprises a belt connecting the input pulley to the output pulley.

According to another aspect of the exemplary embodiment, there is provided an agricultural harvester comprising the above-described header.

The exemplary embodiments of the subject disclosure provide mechanical knife drives that overcome the deficiencies of hydraulically-driven knife drives. In particular, hydraulic fluid leakage and temperature sensitivity associated hydraulic systems, which affect system performance, are eliminated. Additionally, the mechanical knife drives of the subject disclosure are less prone to stall when the knife drives operate at low speeds or in reverse. In particular, the subject mechanical knife drives provide high torque at low speeds and in reverse, thereby considerably reducing the likelihood of stalling of the drives under those conditions.

Other features and advantages of the subject disclosure will be apparent from the following more detail description of the exemplary embodiments.

BRIEF DESCRIPTION OF THE DRAWINGS

The foregoing summary, as well as the following detailed description of the exemplary embodiments of the subject disclosure, will be better understood when read in conjunction with the appended drawings. For the purpose of illustrating the present disclosure, there are shown in the drawings exemplary embodiments. It should be understood, however, that the subject application is not limited to the precise arrangements and instrumentalities shown.

DETAILED DESCRIPTION OF THE DRAWINGS

Figure 1:
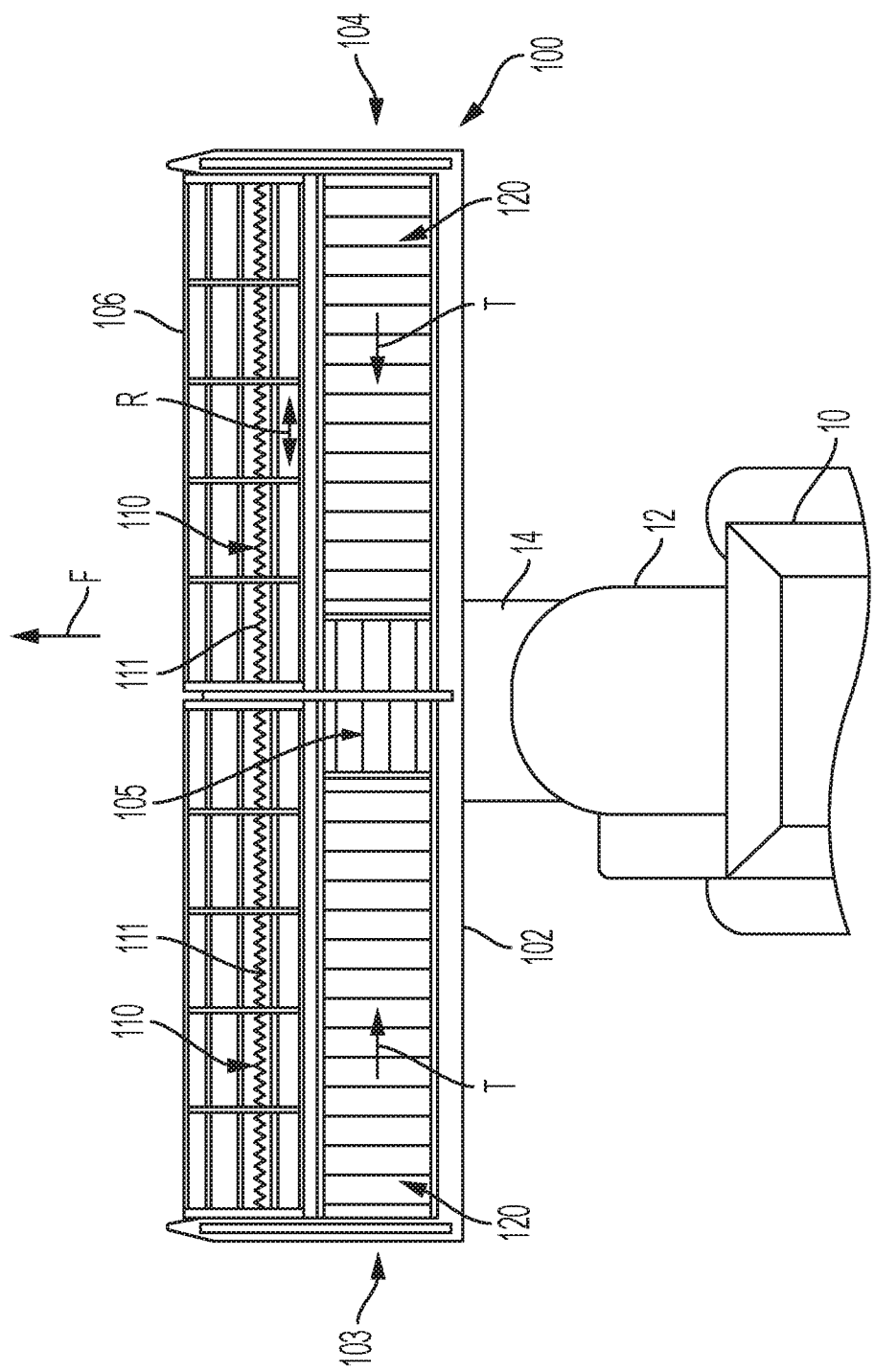
FIG. 1 is a top view of an agricultural vehicle in the form of a combine harvester in accordance with the subject disclosure.

Reference will now be made in detail to the various exemplary embodiments of the subject disclosure illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

The terms "grain," "ear," "stalk," "leaf," and "crop material" are used throughout the specification for convenience and it should be understood that these terms are not intended to be limiting. Thus, "grain" refers to that part of a crop which is harvested and separated from discardable portions of the crop material. The header of the subject application is applicable to a variety of crops, including but not limited to wheat, soybeans and small grains. The terms "debris," "material other than grain," and the like are used interchangeably.

"About" as used herein when referring to a measurable value such as an amount, a temporal duration, and the like, is meant to encompass variations of ±20%, ±10%, ±5%, ±1%, or ±0.1% from the specified value, as such variations are appropriate.

"Substantially" as used herein shall mean considerable in extent, largely but not wholly that which is specified, or an appropriate variation therefrom as is acceptable within the field of art.

Throughout the subject application, various aspects thereof can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the subject disclosure may be combined in any suitable manner in one or more embodiments. One skilled in the relevant art will recognize, in light of the description herein, that the subject disclosure can be practiced without one or more of the specific features or advantages of a particular exemplary embodiment. In other instances, additional features and advantages may be recognized in certain embodiments that may not be present in all exemplary embodiments of the present disclosure.

Referring now to the drawings, and more particularly to FIG. 1, there is shown an exemplary embodiment of an agricultural vehicle 10 in the form of, e.g., a combine harvester which generally includes a chassis 12, a feeder housing or feederhouse 14, and an attachment in the form of a header 100. Typically, the combine harvester 10 will include additional internal systems for the separation and handling of collected crop material. However, these additional systems are not essential for a full and proper understanding of the subject disclosure.

The header 100 is coupled to, and therefore supported by, the chassis 12 of the agricultural vehicle 10 by, for example, coupling to the feeder housing 14. The header 100 has a frame 102 coupled to the chassis 12 by coupling to the feeder housing 14 and a pair of opposed lateral ends 103, 104. The header 100 may support one or more flexible cutter bars 110 with reciprocating knives 111 to cut crop material as the agricultural vehicle 10 travels in a forward direction, denoted by arrow F. The reciprocating knives 111, which may be referred to as cutting elements, can be reciprocated back-and-forth in a lateral direction, denoted by arrow R, relative to the forward direction F in a known manner, e.g., by an unillustrated knife drive including, without limitation, a wobble box, epicyclic drive, etc. Exemplary cutting elements applicable to the present exemplary embodiments are disclosed, e.g., in U.S. Pat. Nos. 7,730,709 and 8,151,547, the entire disclosures of which are incorporated by reference herein in their entirety for all purposes.

The header 100 may further include a center feeder conveyor 105 that conveys the crop material into the feeder housing 14. The header 100 may also include one or more lateral, flexible draper belts 120 (also known as lateral feeder conveyors) that are positioned rearwardly of the cutter bars 110 and travel, e.g. rotate, in opposing directions of travel, denoted by each arrow "T", in order to convey crop material inwardly toward the center feed belt 105 and thereby the feeder housing 14. The header may also include one or more augers 222 (FIG. 2) for conveying crop material from the center feeder belt 105 to the heeder housing. The header 100 may also include a rotating reel 106 with tines or the like to sweep the crop material inwardly towards the draper belts 120 or auger(s).

Figure 2:
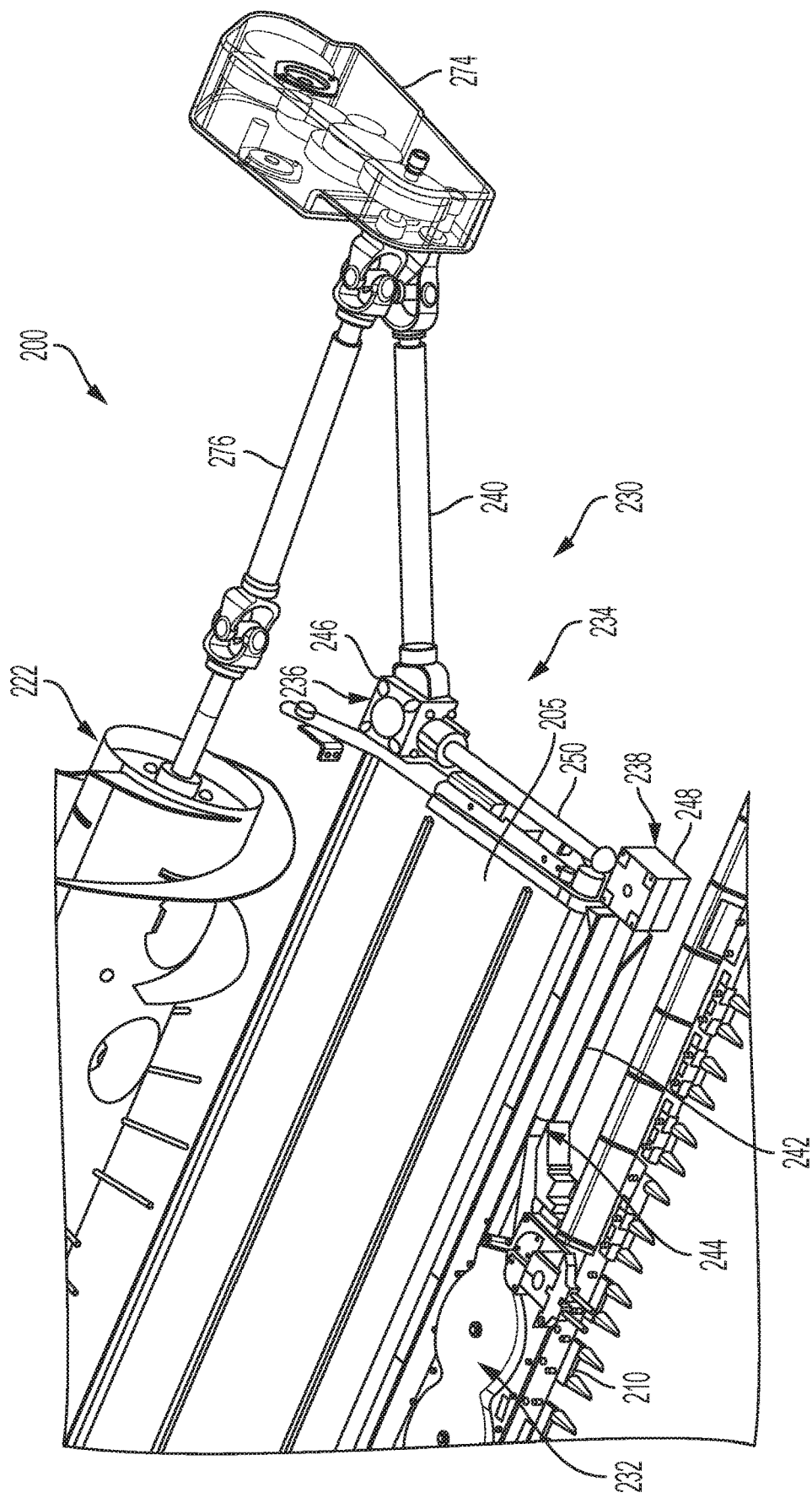
FIG. 2 is a perspective view of a portion of the header of FIG. 1, including a first exemplary embodiment of a mechanical knife drive in accordance with the subject disclosure.
Figure 3:
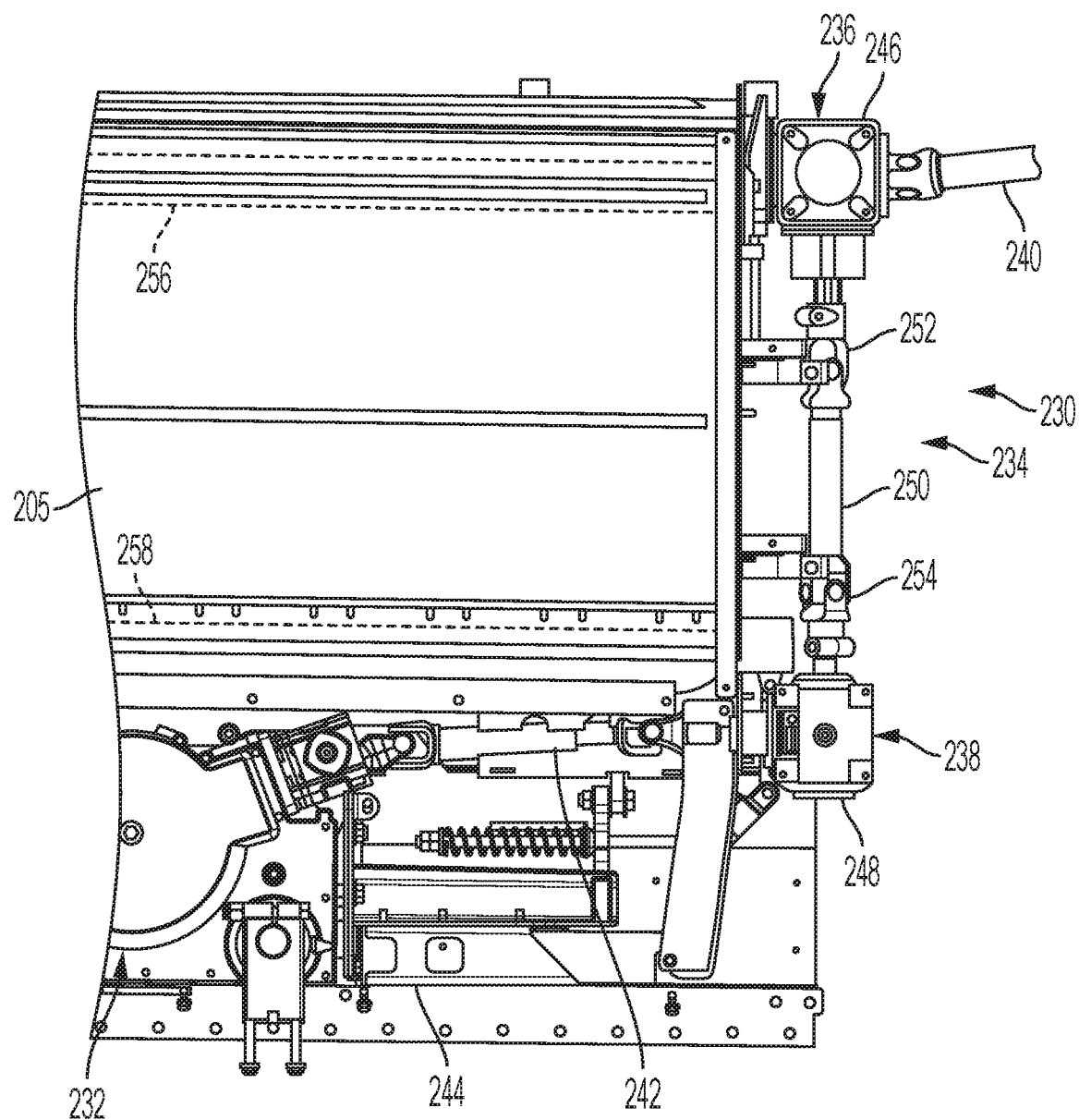
FIG. 3 is a top view of the mechanical knife drive of FIG. 2.

Referring to FIGS. 2 and 3, there is shown a portion of a header 200 including an exemplary embodiment of a mechanical knife drive assembly 230 constructed in accordance with the subject disclosure. The mechanical knife drive assembly 230 comprises a knife drive 232 disposed at a forward end of e.g. the feeder conveyor 205. An infeed drive 234 is disposed adjacent the feeder conveyor. The infeed drive includes an input 236 and an output 238. An input shaft 240 is drivingly connected to the infeed drive input 236, and an output shaft 242 has a first end connected to the infeed drive output 238 and a second end drivingly connected to the knife drive 232. Although not limited thereto, the knife drive 232 can be a center knife drive located substantially centrally of the header 200 for driving flexible cutter bars 210 (only one of which is shown in FIG. 2) in substantially equal and opposite oscillating motion.

In accordance with another exemplary aspect of the header, the mechanical knife drive assembly 230 further comprises a constant velocity joint 244 between the output shaft 242 and the knife drive 232. In lieu of the constant velocity joint 244, a bevel gear set may be situated between the output shaft 242 and the knife drive 232 to transfer rotation from the output shaft to the knife drive. In addition, the output shaft 242 may be supported by at least one bearing to minimize vibration of the output shaft during rotation thereof. According to an aspect, the infeed drive 234 is disposed along a lateral side of the feeder conveyor 205 e.g., the center-feeder conveyor.

In accordance with another aspect of the present embodiment, the infeed drive input 236 comprises a first gearbox 246, the infeed drive output 238 comprises a second gearbox 248, and the infeed drive further comprises a gear shaft 250 connecting the first gearbox to the second gearbox. As shown in FIG. 3, a first universal joint 252 couples a first end of the gear shaft 250 to the first gear box 246 and a second universal joint 254 couples a second end of the gear shaft 250 to the second gear box 248. So constructed, the first gearbox 246 and the second gearbox 248 are disposed along the lateral side of the feeder conveyor 205 and rearwardly of the cutter bar assembly 210.

Referring to FIG. 3, the feeder conveyor 205 includes a drive roller (shown in dashed line at 256) and a driven roller (shown in dashed line at 258). According to an aspect, the infeed drive input 236 is drivingly connected to the drive roller 256 of the feeder conveyor 205.

Referring again to FIG. 2, the header 200 is shown to further comprise a main power source gearbox 274 for driving the input shaft 240. The header 200 further comprises an auger 222 and an auger input shaft 276 connected to the main power source gearbox 274 for driving the input shaft 276. Although not illustrated, the main power source gearbox 274 e.g., derives its motive power from an unillustrated power take off ("PTO") shaft from the harvester 10 in a manner known in the art. That is, the main power source gearbox is operatively connected to the PTO of the harvester.

Figure 4:
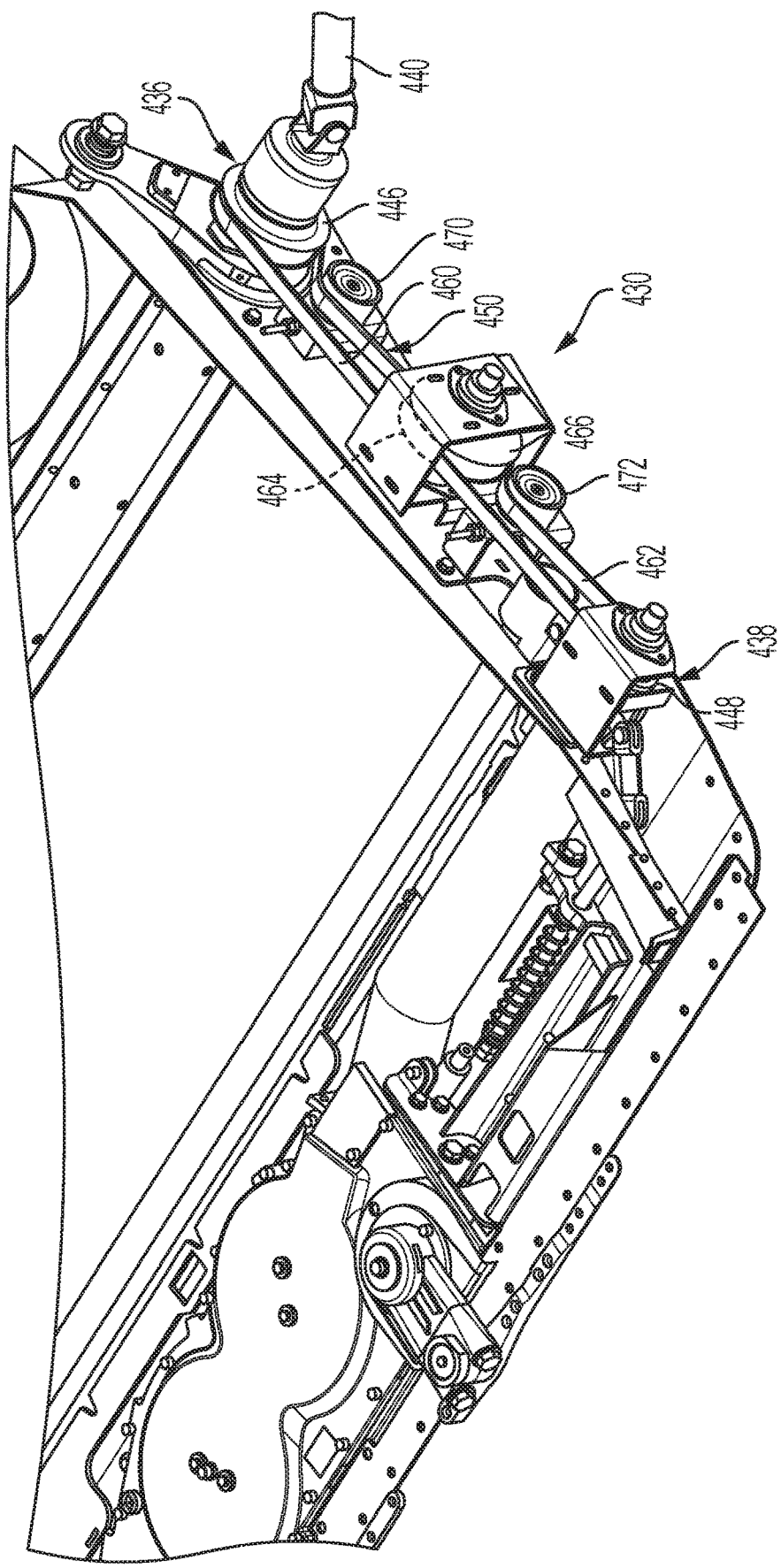
FIG. 4 is a perspective view of a portion of the header of FIG. 1, including another exemplary embodiment of a mechanical knife drive in accordance with the subject disclosure.
Figure 5:
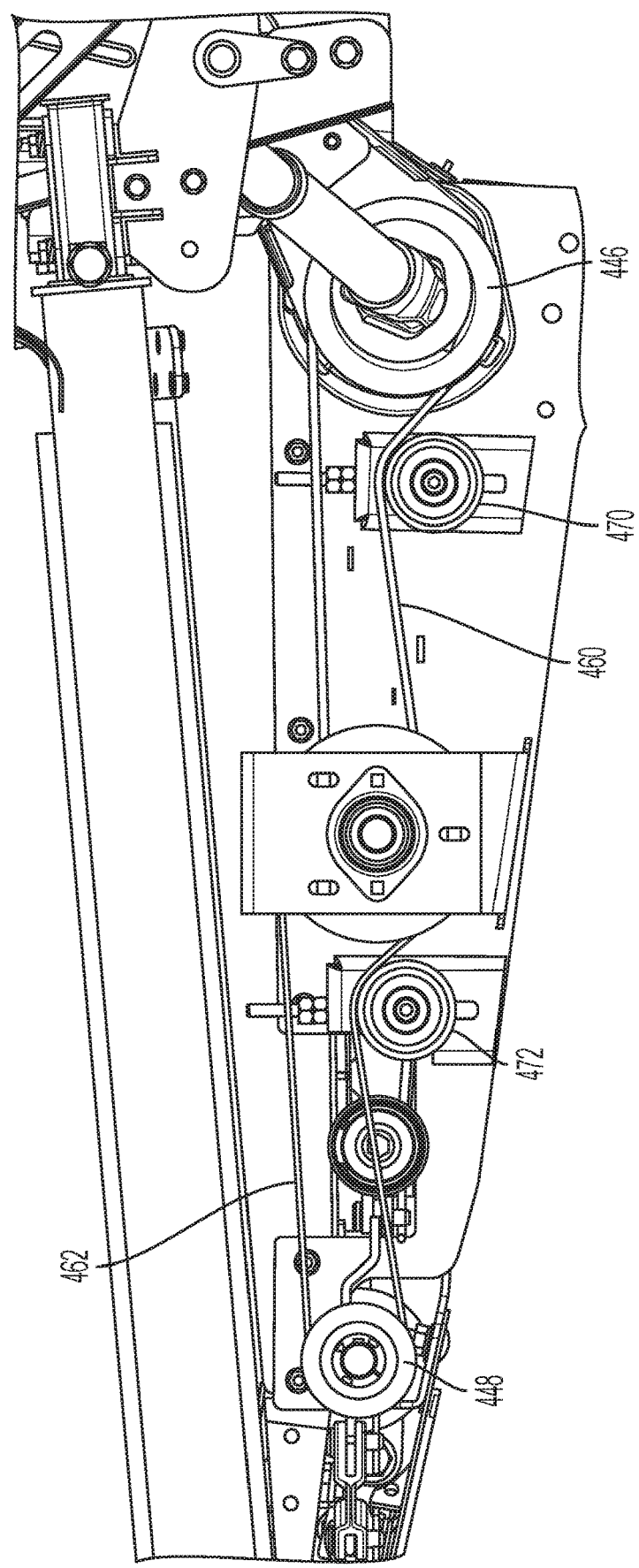
FIG. 5 is a side view of a portion of the mechanical knife drive of FIG. 4.
Figure 6:
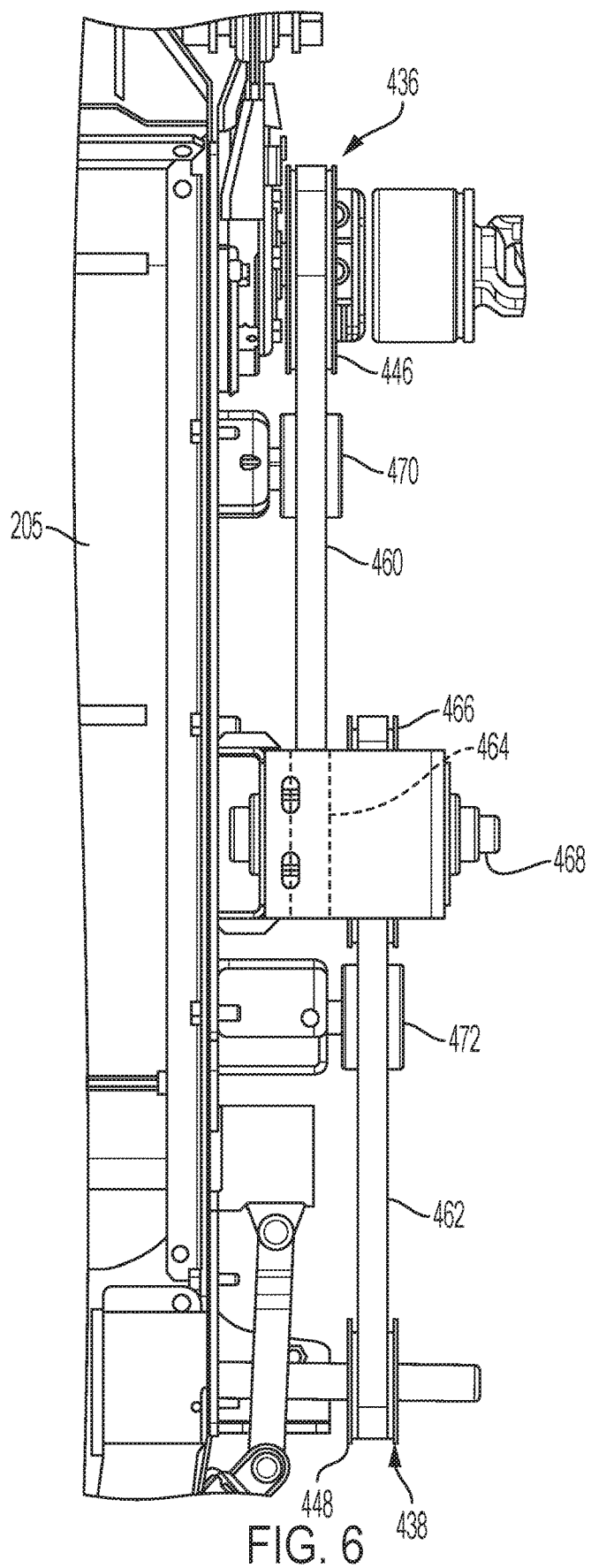
FIG. 6 is a top plan view of a portion of the mechanical knife drive of FIG. 4.

Referring to FIGS. 4 through 6, in accordance with another exemplary embodiment of the subject disclosure, there is shown a mechanical knife drive assembly 430, an input shaft 440, an infeed drive input 436 having an input pulley 446, an infeed drive output 438 having an output pulley 448, and an infeed drive comprising a belt 450 connecting the input pulley to the output pulley. The belt of the infeed drive further comprises a plurality of belts 460, 462 connecting the input pulley 446 to the output pulley 448. As best shown in FIG. 6, the header further comprises a first intermediate pulley 464 and a second intermediate pulley 466 affixed to a common shaft 468. A first one of the plurality of belts 460 connects the input pulley 446 to the first intermediate pulley 464 and a second one of the plurality of belts 462 connects the second intermediate pulley 466 to the output pulley 448. FIGS. 4 through 6 further show that the header further comprises a first idler pulley 470 for adjusting tension in the first one of the plurality of belts 460 and a second idler pulley 472 for adjusting tension in the second one of the plurality of belts 462.

Although not illustrated, it is understood that in lieu of the various pulleys and belts of the mechanical knife drive assembly 430, a mechanical knife drive assembly may be constructed using e.g., sprockets and gears instead of pulleys, and e.g., chains instead of belts and still achieve the desired ends of the subject disclosure.

It will be appreciated by those skilled in the art that changes could be made to the exemplary embodiments described above without departing from the broad inventive concept thereof. It is to be understood, therefore, that this disclosure is not limited to the particular embodiments disclosed, but it is intended to cover modifications within the spirit and scope of the subject disclosure as defined by the appended claims.

We claim:

1. A header for an agricultural harvester comprising:
   a knife drive disposed at a forward end of a feeder belt conveyor;
   an infeed drive disposed adjacent a lateral side of the feeder belt conveyor, the infeed drive having an input and an output;
   an input shaft drivingly connected to the infeed drive input; and
   an output shaft having a first end connected to the infeed drive output and a second end drivingly connected to the knife drive.

2. The header of claim 1, wherein the infeed drive input comprises a first gearbox, the infeed drive output comprises a second gearbox, and the infeed drive further comprises a gear shaft connecting the first gearbox to the second gearbox.

3. The header of claim 2, further comprising a cutter bar connected to the knife drive, wherein the first gearbox and the second gearbox are disposed along a lateral side of the feeder belt conveyor and rearwardly of the cutter bar.

4. The header of claim 1, further comprising a constant velocity joint between the output shaft and the knife drive.

5. The header of claim 1, wherein the infeed drive input is drivingly connected to a drive roller of the feeder conveyor.

6. The header of claim 1, wherein the infeed drive input comprises an input pulley, the infeed drive output comprises an output pulley, and the infeed drive further comprises a belt connecting the input pulley to the output pulley.

7. The header of claim 6, wherein the infeed drive further comprises a plurality of belts connecting the input pulley to the output pulley.

8. The header of claim 6, further comprising a first idler pulley for adjusting tension in a first one of the plurality of belts and a second idler pulley for adjusting tension in a second one of the plurality of belts.

9. The header of claim 1, wherein the knife drive is a center knife drive.

10. The header of claim 1, further comprising a main power source gearbox for driving the input shaft.

11. The header of claim 10, further comprising:
    an auger; and
    an auger input shaft connecting the main power source gearbox to the auger.

12. An agricultural harvester comprising the header of claim 1.

13. A header for an agricultural harvester comprising:
    a knife drive disposed at a forward end of a feeder conveyor;
    an infeed drive disposed adjacent the feeder conveyor, the infeed drive having an input, an output, an input pulley, an output pulley, a plurality of belts connecting the input pulley to the output pulley, a first intermediate pulley, and a second intermediate pulley affixed to a common shaft, wherein a first one of the plurality of belts connects the input pulley to the first intermediate pulley and a second one of the plurality of belts connects the second intermediate pulley to the output pulley;
    an input shaft drivingly connected to the infeed drive input; and
    an output shaft having a first end connected to the infeed drive output and a second end drivingly connected to the knife drive.

14. The header of claim 13, wherein the infeed drive input includes a first gearbox, and the infeed drive output includes a second gearbox, and wherein the infeed drive further comprises a gear shaft connecting the first gearbox to the second gearbox; and
    further comprising a cutter bar connected to the knife drive, wherein the first gearbox and the second gearbox are disposed along a lateral side of the feeder conveyor and rearwardly of the cutter bar.

15. The header of claim 13, further comprising a constant velocity joint between the output shaft and the knife drive.

16. The header of claim 13, further comprising a first idler pulley for adjusting tension in a first one of the plurality of belts and a second idler pulley for adjusting tension in a second one of the plurality of belts.

17. The header of claim 13, wherein the knife drive is a center knife drive.

18. The header of claim 13, further comprising a main power source gearbox for driving the input shaft.

* * * * *